United States Patent [19]

Nakanishi

[11] Patent Number: 4,525,216

[45] Date of Patent: Jun. 25, 1985

[54] INK COMPOSITION

[75] Inventor: Mikihiko Nakanishi, Kawachi-Nagano, Japan

[73] Assignee: Sakura Color Products Corp., Osaka, Japan

[21] Appl. No.: 436,686

[22] Filed: Oct. 26, 1982

[30] Foreign Application Priority Data

Nov. 4, 1981 [JP] Japan .................................. 56-177689

[51] Int. Cl.$^3$ .............................................. C09D 11/08
[52] U.S. Cl. ........................................ 106/30; 106/23; 106/26; 524/77; 524/270
[58] Field of Search ............... 106/23, 26, 30; 524/77, 524/270

[56] References Cited

U.S. PATENT DOCUMENTS

| | | | |
|---|---|---|---|
| 2,602,039 | 7/1952 | Wershaw | 167/58 |
| 3,166,421 | 1/1965 | Granlich | 430/302 |
| 3,475,187 | 10/1969 | Kane | 106/22 |
| 4,256,494 | 3/1981 | Yamamoto et al. | 106/23 |

*Primary Examiner*—Paul Lieberman
*Assistant Examiner*—Amelia B. Yarbrough
*Attorney, Agent, or Firm*—Wenderoth, Lind & Ponack

[57] ABSTRACT

An ink composition for a marking pen is disclosed which permits smooth writing even after a long period of standing of the pen with no cap. The ink composition comprises an organic solvent, a pigment, a resin and at least one additive selected from the group consisting of a glyceride of specified structure, and an alkylamide alcohol of specified structure and a sorbitan fatty acid ester.

An erasable ink composition for writing on a writing surface such as one of resin is also disclosed, which further includes, in addition to the above, a separating agent which is a non-volatile or only slightly volatile liquid or semi-solid at normal temperatures and has a lower vapor pressure than the solvent, and is soluble in the solvent.

8 Claims, No Drawings

INK COMPOSITION

The present invention relates to an ink composition for a so-called marking pen, and more particularly to an ink composition which permits smooth writing after a long period of standing of a marking pen with no cap.

A marking pen usually comprises a holder having an ink chamber therein and a felt-tip at the top thereof communicating with the ink chamber. The ink composition for such a marking pen is so formulated as to dry quickly on a writing surface to form writings or markings thereon, and therefore any conventional ink composition for a marking pen usually includes a pigment, a resin and an organic solvent which has a relatively low boiling point. An ink composition is also known, as is disclosed in U.S. Pat. No. 4,256,494, for example, which is applied onto a white or colored writing surface made of synthetic resin, metal, glass and enamel, known as a white board, and of which writings or markings can be readily erased by wiping with cloth or paper. This erasable ink composition further includes a non-volatile or only slightly volatile liquid or semi-solid as a separating agent.

As described above, since an ink composition for a marking pen includes various ingredients dissolved or dispersed in an organic solvent having a relatively low boiling point, the ink composition has a general tendency to clog the felt-tip of marking pen with the pigment and the resin deposited from the ink composition when the felt-tip is left standing for many hours with no cap thereon, as the solvent evaporates from the tip. That is, the deposited pigment and resin prevent smooth flow of ink composition from the tip, and makes writings or markings formed on a writing surface thin and unclear. Finally the pen "dries up," and writing becomes impossible.

It is, therefore, an object of the present invention to obviate the disadvantages involved in the prior art, and to provide an improved ink composition which permits smooth writing on a writing surface even after a marking pen is left standing with no cap covering the felt-tip of the pen for a long period of time.

In particular, it is an important object of the present invention to provide an erasable ink composition for writing on a writing surface such as one of resin and enamel, which will not dry up even after a long standing of marking pen with no cap.

Other objects and features of the invention will be apparent from the following description thereof.

The ink composition of the invention comprises:
about 40-90% by weight of an organic solvent;
about 1-10% by weight of a pigment;
about 0.5-30% by weight of a resin which is soluble in the solvent; and
about 0.05-10% by weight of at least one anti-drying additive which is selected from the group consisting of
(a) a glyceride of the general formula

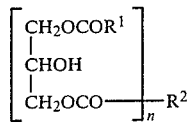
(I)

wherein $R^1$ represents a fatty acid residue of 7-23 carbons, $R^2$ represents a mono- or polybasic hydroxycarboxylic acid residue of 1-23 carbons, and n is an integer of 1 or 2, (b) an alkylamide alcohol of the general formula

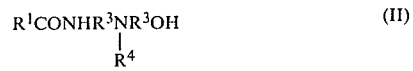
(II)

wherein $R^1$ is the same as above, $R^3$ represents an alkylene of 1-4 carbons, and $R^4$ represents hydrogen or a group of the general formula

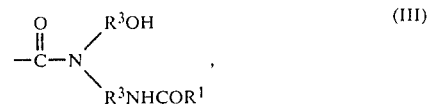
(III)

or an intramolecular condensate of the alkylamide alcohol of the formula

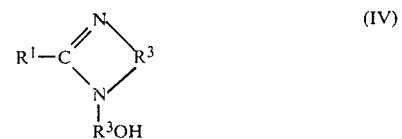
(IV)

when $R^4$ is hydrogen, or salts of the alkylamide alcohol or intramolecular condensate with fatty acids of 1-8 carbons, and (c) a sorbitan fatty acid ester of the general formula

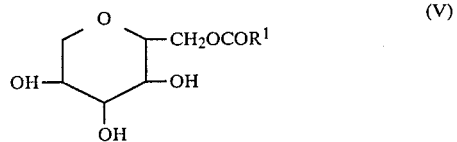
(V)

or

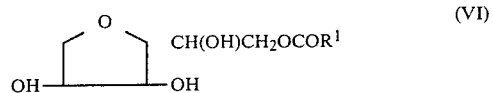
(VI)

wherein $R^1$ is the same as above.

The solvent used in the invention includes any solvent which has been heretofore used for producing a conventional ink composition for a marking pen, and is not specifically limited. However, the preferred solvents used are, for example, a lower alkyl ketone such as methyl ethyl ketone and methyl isobutyl ketone, a lower aliphatic alcohol ester of a lower fatty acid such as ethyl acetate, amyl acetate and butyl propionate, an aromatic hydrocarbon such as benzene, toluene and xylene, a lower aliphatic alcohol such as methanol, ethanol, propanol and butanol, a lower alicyclic alcohol such as cyclohexanol, a glycol monoalkyl ether such as ethylene glycol monomethyl ether and methoxybutanol, and a mixture of two or more of the above. The solvent is usually contained in the ink composition in amounts of about 40-90% by weight, preferably about 60-85% by weight based on the ink composition.

The pigment used in the invention includes any pigment and dye, which are either soluble in the solvent, and either inorganic or organic. For an erasable ink composition for writing on a writing surface such as one of resin, enamel, metal and glass of the invention, the pigment and the dye are preferably insoluble in the solvent used. Either an inorganic or organic pigment or dye which has been heretofore used for an erasable ink composition can be used herein so long as the pigment and dye can be uniformly dispersed in the solvent with other ingredients.

Dyes such as a dispersed dye and a vat dye may be used as a pigment since they are insoluble in the solvent.

Although the content of the pigment in the ink composition of the invention varies depending upon the pigment used and shade required on a writing surface, the content of the pigment is usually 1-30% by weight, preferably 3-10% by weight, based on the ink composition. Too large a content of pigment makes the ink composition less stable and the viscosity of the composition excessively high, and may cause precipitation of pigment, thus to make smooth writing difficult. On the other hand, the ink composition containing too small a content of pigment forms writings or markings with an insufficient degree of shade on a writing surface.

According to the invention, the ink composition contains at least one anti-drying additive which is selected from the group consisting of aforesaid glyceride I, alkylamide alcohol II, including the intramolecular condensate thereof IV and fatty acid salts of the alkylamide alcohol and condensate, and sorbitan fatty acid ester V and VI. These additives are soluble in the solent, and are preferably solid or semi-solid at normal temperatures.

In the glyceride I, $R^1$ represents a fatty acid residue of 7-23 carbons, saturated or unsaturated, and some examples of the fatty acid are stearic acid, oleic acid, palmitic acid and linolic acid, $R^2$ represents a monobasic or polybasic hydroxycarboxylic acid residue of 1-23 carbons, preferably 1-8 carbons. Preferred hydroxycarboxylic acids used in the invention are monobasic hydroxycarboxylic acids such as glycolic acid, lactic acid, α-hydroxybutyric acid, glyceric acid and ricinoleic acid, and polybasic hydroxycarboxylic acids such as malic acid, tartaric acid, citric acid, etc.

In the formula I, n is an integer of 1 or 2. When n is 2, the glyceride has two $R^1$'s, and the two may be different from each other.

Many of the glycerides I are sold by Taiyo Kagaku K. K. (Japan) under the name of "Sunsoft."

In the alkylamide alcohol II, $R^1$ is the same as before, and $R^3$ represents an alkyl group of 1-4 carbons, for example, methylene, ethylene and propylene. $R^4$ represents hydrogen or the aforesaid group III, wherein $R^1$ and $R^3$ are the same as before. The alkylamide alcohol wherein $R^4$ is hydrogen has the formula $$R^1CONHR^3NHR^3OH \quad (VII)$$

This compound is prepared by the reaction of a fatty acid of the general formula $R^1COOH$ with an aminoalkylenealkanolamine of the general formula $H_2NR^3NHR^3OH$, wherein $R^1$ and $R^3$ are the same as before.

Many of the alkylamide alcohols of the kind are available as a salt of a fatty acid, typically a formic acid salt. For example, "Softol" and "Softer" sold by Nippon Yushi K. K. (Japan) are formic acid salt of alkylamide alcohol wherein $R^3$ is ethylene. However, the acid which forms a salt of alkylamide alcohol is not restricted to formic acid, and the salt of fatty acid of 1-8 carbons are preferably used, and preferred examples of such fatty acids are acetic acid, propionic acid and butyric acid. However, a higher fatty acid of up to 20 carbons may be used for the salt forming, such as palmitic and stearic acid, if desired. The alkylamide alcohol in the free form can of course be used effectively in the invention.

The alkylamide alcohol VII provides a cyclic compound of the general formula IV as before stated, and it is obtainable by the intramolecular condensation of the alkylamide alcohol VII which has hydrogen as $R^4$. The condensate may be produced as a by-product in the production of alkylamide alcohol II. The condensate and a mixture thereof with the alkylamide alcohol II, either in free form or as the salt of a fatty acid may be used as the anti-drying additive in the invention. A mixture of VII and its condensate IV is sold as formic acid salt, "Softer 706" of Nippon Yushi K. K. (Japan).

An alkylamide alcohol in which $R^4$ is the aforesaid N,N-disubstituted aminocarbonyl III has the general formula

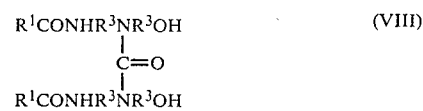

$$\begin{array}{c} R^1CONHR^3NR^3OH \\ | \\ C=O \\ | \\ R^1CONHR^3NR^3OH \end{array} \quad (VIII)$$

is prepared by the condensation reaction of the alkylamide alcohol VII with urea, and is available as the formic acid salt. For example, when $R^3$ is ethylene, the product is "Softer AC-70" sold by Nippon Yushi K. K. (Japan).

Now in the sorbitan ester V and VI, $R^1$ is the same as before, and preferred esters are palmitic acid esters and stearic acid esters. It is well known that sorbitan fatty acid esters usually contain many kinds of isomers, and the sorbitan fatty acid ester V and VI may contain such isomers in any amounts. The sorbitan fatty acid ester is available as nonionic surfactants such as "Rikemal" of Riken Vitamin Oil K. K. (Japan) and "Nonion" of Nippon Yushi K. K. (Japan).

According to the invention, at least one of the anti-drying additives as described above is contained in the ink composition in amounts of 0.05-10% by weight, preferably 0.1-5% by weight, based on the ink composition. When the ink composition contains the additive in amounts less than 0.05% by weight based on the ink composition, it still has a tendency to dry up when left standing for many hours, and when more than 10% by weight, the ink composition becomes unstable, resulting in an unsatisfactory anti-drying effect.

The ink composition of the invention includes a resin for forming a stable dispersion of the pigment in the solvent as well as for providing a suitable adhesion on a writing surface. Thus, the resin is contained in amounts of about 0.5-30% by weight, preferably 5-20% by weight, based on the ink composition. Any resin, as long as it is soluble in the solvent used, may be used for an ink composition which needs no erasability for writing on a pervious surface like paper or cloth. Some examples of resin used are natural resins such as rosin, processed rosin such as rosin ester and hydrogenated rosin and rosin-modified resin such as rosin-modified maleic acid resin and rosin-modified phenol resin, and synthetic resin such as phenol resin and its copolymers, cellulose resin including ethylcellulose and acetylcellulose, petroleum resin, ketone resin, polyvinylbutyral, vinyl chloride-vinyl acetate copolymer, vinylidene chloride-acrylonitrile copolymer and vinylidene chloride-vinyl chloride copolymer.

However, when the ink composition is required to form erasable writings or markings on a white board surface, the resin used should be soluble both in the solvent and a solution of a separating agent, which will be hereinafter described, in the solvent, and is insoluble or only slightly soluble in the separating agent so that the ink remains a stable and uniform dispersion for a long period of time, and also so that a liquid film substantially comprising the separating agent is formed on the writing surface when writing.

Some examples of the resins which meet these requirements are a vinyl polymer such as polyvinyl butyral, vinyl chloride-vinyl acetate copolymer, vinylidene chloride-acrylonitrile copolymer, a cellulose resin such as ethylcellulose and acetyl cellulose, and a mixture of two or more of these polymers.

The separating agent which is contained in the ink composition so as to provide thereto erasability on a white board surface is a non-volatile or only slightly volatile liquid or semi-solid with a lower vapor pressure than that of the solvent used at normal temperatures of about 0–50° C., and is soluble in the solvent used. Various separating agents are already known in the art, and the preferably used separating agents are a higher fatty acid ester, a phthalic acid diester, a glycol, glycerine, a higher aliphatic alcohol, a higher aliphatic alcohol monoether of ethylene glycol and diethylene glycol, liquid paraffin, and a mixture of two or more of these.

In more detail, the higher fatty acid ester preferably used in the invention consists of a fatty acid of 12–22 carbons and a lower aliphatic alcohol of 1–5 carbons, among which are, for example, butyl stearate, propyl palmitate, ethyl oleate, and a mixture thereof. The phthalic acid diester preferably used in the invention is a diester of an aliphatic alcohol of 4–13 carbons such as dibutyl phthalate, dioctyl phthalate, dilauryl phthalate, ditridecyl phthalate and a mixture of two or more of these phthalates.

The glycols used in the invention are preferably polyalkyleneglycols and polyoxyalkyleneglycols of 2–100 carbons, and some preferred examples of glycol are ethylene glycol, diethylene glycol, triethylene glycol, propylene glycol, dipropylene glycol, butylene glycol, liquid 2,5-hexanediol, liquid or semi-solid polyethylene glycol, polypropylene glycol, polyethylene/propylene glycol and the like of molecular weight of 200–300. The higher aliphatic alcohol monoether of ethylene glycol and diethylene glycol is also a preferable separating agent used in the invention. The ether compound is such that it has an alkyl of 8–22 carbons, and some examples thereof are monooctyl ether and monolauryl ether. The aliphatic alcohol used in the invention is not specifically limited as far as it is liquid or semi-solid which is non-volatile or only slightly volatile at normal temperatures, and it may be either linear or branched, and also may be either saturated or unsaturated. However, preferably used alcohols are saturated or unsaturated fatty alcohols having 8–22 carbons, among which are, for example, octyl alcohol, capryl alcohol, oleyl alcohol, octyldodecanol, and a mixture of two or more of these.

The separating agent is contained in the ink composition in amounts of about 1–25% by weight, preferably about 2–15% by weight, based on the ink composition. The ink composition containing less than about 1% by weight of the separating agent is not readily erased by a light mechanical abrasion, or wiping. On the other hand, the ink composition containing more than about 25% by weight of the separating agent does not quickly dry on a white board and will result in unclear and lusterless writings or markings on the white board.

According to the present invention, a surfactant may be contained in the ink composition in combination with the separating agent to facilitate the function of separating agent so that writings or markings formed therewith on a white board surface are more readily erased by wiping. One of the surfactants used preferably is a non-ionic surfactant such as a higher alkyl ether and a higher alkylphenol ether of polyoxyethylene glycol, for example, octyl ether and nonylphenol ether of polyoxyethylene glycol. A polyoxyethylene glycol higher fatty acid ester and sorbitan higher fatty acid ester such as palmitate and stearate is also preferably used. Another surfactant is an anionic one, among which are a higher fatty acid salt, a higher aliphatic alcohol sulfonate, an alkylbenzenesulfonate, an alkylnaphthalenesulfonate, a dialkylsulfosuccinate, an alkylphosphate, a polyoxyethylene glycol sulfate and polyoxyethylene glycol phosphate. The above surfactants are well known and are readily available in the market.

The amount of the surfactant in the ink composition is up to 10% by weight, preferably 0.1–5% by weight, based on the ink composition. However, the total amount of the separating agent and the surfactant is up to 25% by weight since the use of excessive amounts of surfactant may make the ink composition difficult to dry quickly on a writing surface.

A method of producing the ink composition of the invention will now be described. However, the following method is for illustrative puposes only, and is not to be construed to limit the scope of the invention.

When a pigment insoluble in the solvent is used, a finely divided power thereof is mixed thoroughly with the solvent to form a uniform dispersion. Then a resin is added to the dispersion, which is heated to temperatures of about 50°–60° C. to dissolve the resin in the mixture. The anti-drying additive is then added to the resultant mixture and dissolved therein by stirring with heating the mixture at temperatures of about 50°–60° C., to provide the ink composition of the invention. When a dye soluble in a solvent is used, a resin is added to a solution of the dye in the solvent, heated to temperatures of about 50°–60° C. to dissolve the resin therein, and then the additive is added to the resultant mixture and dissolved therein.

For the production of erasable ink composition, the separating agent is added to and dissolved in the intermediate mixture at any stage. A surfactant is also applied in any stage of the production of the ink composition, but preferably together with the separating agent. However, the order of mixing, means for mixing, heating temperatures, etc. are not critical in the invention.

The present invention is not restricted to any theory, but according to the invention, since the ink composition includes the aforesaid anti-drying additive in such amounts that the additive deposits and forms a thin solid film on the surface of a felt-tip when only a slight portion of the solvent near the surface of the tip evaporates, therefrom, there occurs no "drying up" even in the case where the tip is left standing for a long time with a cap removed therefrom. When writing, after being left standing for a long time with no cap, the film formed on the surface of the tip is readily broken by writing pressure and dissolution of the film by the solvent inside the tip and thus there is no difficulty caused on writing. Friction heat generated on writing might be another reason for smooth writing after a long period of standing with no cap.

The film may be formed on the tip immediately when the cap is removed from the tip, depending upon the additive used, the content thereof, the solvent used and the content thereof. However, as just described above, the film is readily broken when writing, and thus not causing any obstacles.

Furthermore, in the ink composition of the invention, the separating agent and the resin are both soluble in the solvent, so that the ink composition remains a uniform dispersion or solution even when it is unused for a long period of time.

The ink composition of the invention has a further advantage in that it is readily erased by wiping with cloth or paper when it contains the separating agent. The resin is soluble in a solution of the separating agent in the solvent, but is insoluble or only slightly soluble in the separating agent. Therefore, when writing or marking is formed on a surface such as one of resin or enamel and the solvent has evaporated therefrom, the separating agent will form a thin liquid or semi-solid film on the surface, and most of the pigment, the resin and the additive remain on or in the film, thereby forming a writing or marking on the surface. Thus, as is apparent, the writing or marking is readily removed or erased from the surface by light mechanical abrasion or wiping with cloth or paper.

The present invention will be more clearly understood with reference to the following examples.

In the examples, a general procedure for preparing the ink composition of the invention is as follows:

A finely divided pigment or a dye, and a resin were added to an organic solvent followed by stirring the resultant mixture for about 1 hour at temperatures of 50°-60° C. to provide a uniform solution or dispersion. To this mixture thus obtained was then added an anti-drying additive and a separating agent when an erasable ink composition is produced, if desired together with a surfactant, and stirred for another 1 hour at the same temperatures as above, thus to provide an ink composition of the invention.

In the examples, amounts of the ingredients are expressed as % by weight.

Each ink composition thus prepared was then charged in an ink chamber in a holder of a marking pen which has a felt-tip at the end with a cap carried thereon. The cap was then removed from the tip, and the marking pen was allowed to stand under windless conditions at a temperature of 25° C. and under a relative humidity of 60%, writing with the pen on a resin surface at intervals of 5 minutes, thereby estimating the period of time until the pen "dried up," when the writings became remarkably unclear and smooth writing became difficult.

For comparison, the same ink compositions as those above except that they contain no anti-drying additive, and their drying-up times were estimated in the same manner as before.

The drying-up time in minutes are set forth in the following examples in the form of A/B wherein A represents the drying-up time of the ink composition of the invention, and B that of the ink composition of the comparison example as above.

EXAMPLE 1

| | | |
|---|---|---|
| Pigment | Neozapon Black RE[1] | 14.0 |
| | Varifast Yellow 4120[2] | 1.0 |
| Resin | Teskid MRM 42[3] | 10.0 |
| | Santolite MHP | 7.0 |
| Solvent | Ethyleneglycol monomethylether | 62.0 |
| | Diethyleneglycol monomethylether | 5.0 |
| Additive | Softol AY[5] | 1.0 |
| Drying-up time | 60/20 | |

EXAMPLE 2

| | | |
|---|---|---|
| Pigment | Orazol Black RL[6] | 14.0 |
| | Varifast Yellow 4120 | 1.0 |
| Resin | Teskid MRM 42 | 10.0 |
| | Santolite MHP | 7.0 |
| Solvent | Ethyleneglycol monomethylether | 60.0 |
| | Ethyleneglycol monobutylether | 3.0 |
| Additive | Softer 706[7] | 4.0 |
| Drying-up time | 90/20 | |

EXAMPLE 3

| | | |
|---|---|---|
| Pigment | Varifast Red 1808[8] | 6.0 |
| Resin | Rosin WW[9] | 10.0 |
| | Santolite MHP | 5.0 |
| | Ethocel[10] | 0.3 |
| Solvent | Ethyleneglycol monoethylether | 56.7 |
| | Ethanol | 10.0 |
| | Amyl acetate | 10.0 |
| Additive | Sunsoft 609A[11] | 2.0 |
| Drying-up time | 60/15 | |

EXAMPLE 4

| | | |
|---|---|---|
| Pigment | Oil Blue BA[12] | 1.2 |
| | Varifast Blue 1603[13] | 3.8 |
| Resin | Tamanol 100S[14] | 10.0 |
| | Ethocel | 0.1 |
| Solvent | Ethyleneglycol monoisopropylether | 76.4 |
| | Ethyl acetate | 5.0 |
| | Isobutanol | 2.5 |
| Additive | Nonion PP-40R[15] | 1.0 |
| Drying-up time | 100/30 | |

EXAMPLE 5

| | | |
|---|---|---|
| Pigment | Neozapon Black RE | 14.0 |
| | Varifast Yellow 4120 | 1.0 |
| Resin | Halon 80[16] | 10.0 |
| | Nikanol HP 120[17] | 3.0 |
| Solvent | Ethyleneglycol monomethylether | 66.2 |
| | Xylene | 5.0 |
| Additive | Softol AY | 0.5 |
| | Nonion PP-40R | 0.3 |
| Drying-up time | 60/20 | |

EXAMPLE 6

| | | |
|---|---|---|
| Pigment | Oil Blue BA | 1.2 |
| | Varifast Blue 1603 | 3.8 |
| Resin | Teskid MRM 42 | 10.0 |
| | Nikanol HP 120 | 3.0 |
| Solvent | Ethyleneglycol monoethylether | 71.0 |
| | Methyl ethyl ketone | 10.0 |
| Additive | Softer AC-70[18] | 0.8 |

EXAMPLE 7

| Pigment | Varifast Blue 1603 | 5.0 |
|---|---|---|
| Resin | Rosin WW | 10.0 |
| | Nikanol HP 120 | 4.0 |
| Solvent | Ethyleneglycol monoethylether | 64.5 |
| | Amyl acetate | 15.0 |
| Additive | Butyric acid salt of Amine AY[20] | 1.5 |
| Drying-up time | 70/20 | |

EXAMPLE 8

| Pigment | Neozapon Black RE | 13.0 |
|---|---|---|
| Resin | Tamanol 100S | 10.0 |
| | Ethocel | 0.1 |
| Solvent | Ethyleneglycol monoethylether | 71.6 |
| | Ethyl acetate | 5.0 |
| Additive | Amine AY | 0.3 |
| Drying-up time | 40/10 | |

EXAMPLE 9

| Pigment | Neozapon Black RE | 4.0 |
|---|---|---|
| Resin | Denka Butyral 2000L[21] | 4.0 |
| Solvent | Ethanol | 44.0 |
| | Isopropanol | 35.0 |
| Additive | Softer AC-70 | 2.0 |
| Separating agent | Polyethyleneglycol of average molecular weight of about 200 | 10.0 |
| Drying-up time | 150/5 | |

EXAMPLE 10

| Pigment | Phthalocyanine Green[22] | 2.5 |
|---|---|---|
| Resin | Denka Butyral 2000L | 2.5 |
| Solvent | Ethanol | 75.2 |
| | Ethyleneglycol monomethylether | 10.0 |
| Additive | Amine AY | 0.8 |
| Separating agent | n-Butyl stearate | 6.0 |
| | Polyethyleneglycol of average molecular weight of about 200 | 3.0 |
| Drying-up time | 60/5 | |

EXAMPLE 11

| Pigment | Phthalocyanine Blue[23] | 4.0 |
|---|---|---|
| Resin | Denka Butyral 2000L | 4.0 |
| Solvent | Ethanol | 51.0 |
| | Ethyl acetate | 30.0 |
| Additive | Sunsoft 601B | 1.0 |
| Separating agent | Polyethylene glycol of average molecular weight of about 200 | 10.0 |
| Drying-up time | 60/5 | |

EXAMPLE 12

| Pigment | Carbon Black | 4.0 |
|---|---|---|
| Resin | Denka Butyral 2000L | 4.0 |
| Solvent | Ethanol | 61.5 |
| | Isopropanol | 22.0 |
| Additive | Sunsoft 601B | 0.5 |
| Separating agent | n-Butyl stearate | 8.0 |
| Drying-up time | 60/5 | |

EXAMPLE 13

| Pigment | Carbon Black | 4.0 |
|---|---|---|
| Resin | Ethocel | 4.0 |
| Solvent | Ethanol | 64.0 |
| | Ethyl acetate | 20.0 |
| Additive | Sunsoft 609A | 1.0 |
| | Rikemal S-300[24] | 1.0 |
| Separating agent | Octyl stearate | 6.0 |
| Drying-up time | 80/5 | |

EXAMPLE 14

| Pigment | Permanent Red F4R[25] | 3.0 |
|---|---|---|
| Resin | Ethocel | 3.0 |
| Solvent | Ethyleneglycol monoethylether | 39.0 |
| | Isopropanol | 40.0 |
| Additive | Softer 706 | 4.0 |
| Separating agent | Triethyleneglycol | 11.0 |
| Surfactant | Nonion NS-210[26] | 0.5 |
| Drying-up time | 200/5 | |

EXAMPLE 15

| Pigment | Phthalocyanine Green | 4.0 |
|---|---|---|
| Resin | Ethocel | 4.0 |
| Solvent | Methanol | 42.0 |
| | Isopropanol | 39.0 |
| Additive | Rikemal S-300 | 1.0 |
| Separating agent | Isopropyl myristate | 9.0 |
| Surfactant | Nonion S-4[27] | 1.0 |
| Drying-up time | 40/5 | |

EXAMPLE 16

| Pigment | Permanent Red F4R | 3.0 |
|---|---|---|
| Resin | Denka Butyral 2000L | 3.0 |
| Solvent | Ethanol | 83.0 |
| Additive | Propionic acid salt of Amine AY | 0.5 |
| Separating agent | Isopropyl palmitate | 10.0 |
| Surfactant | Nonion S-4 | 0.5 |
| Drying-up time | 90/5 | |

EXAMPLE 17

| Pigment | Carbon Black | 4.0 |
|---|---|---|
| Resin | Denka Butyral 2000L | 4.0 |
| Solvent | Ethanol | 61.5 |
| | Isopropanol | 21.0 |
| Additive | Softer 1000[28] | 0.5 |
| Separating agent | Plysurf A212C[29] | 1.0 |
| Drying-up time | 150/5 | |

NOTES:
[1]C.I. Solvent Black 27, BASF
[2]C.I. Solvent Yellow 21, Orient Kagaku Kogyo K.K.
[3]Rosin-modified maleic acid resin, Tokushima Seiyu K.K.
[4]Sulfoamide resin, Monsanto Chemical Co.
[5]Mainly comprises formic acid salt of alkylamide alcohol from stearic acid and aminoethylethanolamine, Nippon Yushi K.K.
[6]C.I. Solvent Black 29, CIBA -continued

NOTES:

[7] Mixture of formic acid salt of alkylamide alcohol from stearic acid and aminoethylethanolamine and its intramolecular cyclic condensate, Nippon Yushi K.K.
[8] Mixture of C.I. Acid Red 23, Orient Kagaku Kogyo K.K.
[9] Rosin resin, Tokushima Seiyu K.K.
[10] Ethylcellulose resin, Dow Chemical Co.
[11] The glyceride I wherein $R^1$ is a mixture of oleic acid residue and stearic acid residue, $R^2$ is malic acid residue, and n is 2, Taiyo Kagaku K.K.
[12] C.I. Solvent Blue 14, Chuo Gosei Kagaku K.K.
[13] Mixture of C.I. Direct Blue 86, Orient Kagaku Kogyo K.K.
[14] Oil-soluble phenol resin, Arakawa Kagaku K.K.
[15] Sorbitan palmitate, Nippon Yushi K.K.
[16] Ketone resin, Honshu Kagaku Kogyo K.K.
[17] Alkylphenol-xylene resin, Mitsubishi Gas Kagaku K.K.
[18] Formic salt of condensate of alkylamide alcohol from stearic acid and aminoethylethanolamine, and urea, Nippon Yushi K.K.
[19] Glyceride I wherein $R^1$ is stearic acid residue, $R^2$ is malic acid residue, and n is 2, Taiyo Kagaku K.K.
[20] Free alkylamide alcohol from stearic acid and aminoethylethanolamine, Taiyo Kagaku K.K.
[21] Polyvinylbutyral resin, Denki Kagaku Kogyo K.K.
[22] C.I. 74260
[23] C.I. 74160
[24] Sorbitan stearate, Riken Vitamine Oil K.K.
[25] C.I. 12335, ICI
[26] Polyoxyethylene glycol nonylphenol ether, Nippon Yushi K.K.
[27] Polyoxyethylene glycol monostearate, Nippon Yushi K.K.
[28] The same as Softol AY
[29] Nonionic-anionic surfactant, polyoxyethylene alkyl ether phosphate, Dai-ichi Kogyo Seiyaku K.K.
*The alkylamide alcohol, the mixture of alkylamide alcohol and its intramolecular cyclic condensate, and the condensate of alkylamide alcohol with urea are all available as aqueous solutions. In the EXAMPLES such solutions were used, but the amount of additive set forth is that of additive itself.

The ink compositions of the invention prepared in EXAMPLES 9–17 formed writing or marking on the resin surface which was found to be readily erased by wiping with cloth.

What is claimed is:

1. An ink composition for a marking pen which consists essentially of:
   about 40–90% by weight of a volatile organic solvent;
   about 1–10% by weight of a pigment;
   about 0.5–30% by weight of a resin which is soluble in the solvent; and
   about 0.05–10% by weight of at least one anti-drying additive which is selected from the group consisting of
   (a) a glyceride of the general formula $$\begin{bmatrix} CH_2OOCR' \\ | \\ CHOH \\ | \\ CH_2OOC \end{bmatrix}_n R^2 \quad (a)$$

wherein $R^1$ represents a fatty acid residue of 7–23 carbons, $R^2$ represents a mono- or polybasic hydroxycarboxylic acid residue of 1–23 carbons, and n is an integer of 1 or 2,
   (b) an alkylamide alcohol of the general formula $$R^1CONHR^3NR^3OH \\ | \\ R^4$$

wherein $R^1$ is the same as above, $R^3$ represents an alkylene of 1–4 carbons, and $R^4$ represents hydrogen or a group of the general formula $$\begin{matrix} O & R^3OH \\ \| & / \\ -C-N & \\ & \backslash \\ & R^3NHCOR^1 \end{matrix}$$

or an intramolecular condensate of the alkylamide alcohol of the formula $$R^1-C \overset{N}{\underset{\underset{R^3OH}{N}}{\overset{}{\diagdown}}} R^3$$

wherein $R^4$ is hydrogen, or salts of said alkylamide alcohol or intramolecular condensate with fatty acids of 1–8 carbons, and
   (c) a sorbitan fatty acid ester of the general formula $$\begin{matrix} O & CH_2OOCR' \\ HO & OH \\ & OH \end{matrix} \quad (c)$$

or $$\begin{matrix} O & CH(OH)CH_2OOCR' \\ HO & OH \end{matrix}$$

wherein $R^1$ is the same as above.

2. The ink composition as claimed in claim 1 wherein $R^1$ is a fatty acid residue of 13–17 carbons, $R^2$ is malic acid residue, and n is 2.

3. The ink composition as claimed in claim 1 which further includes about 1–25% by weight of a separating agent which is a non-volatile or only slightly volatile liquid or semi-solid at normal temperatures and has a lower vapor pressure than the solvent, and is soluble in the solvent.

4. The ink composition as claimed in claim 3 which further includes up to about 10% by weight of a surfactant selected from the group consisting of a nonionic surfactant which is a higher alkyl ether, a higher alkylphenol ether, a higher fatty acid ester or a sorbitan ester of polyoxyethylene glycol, and an anionic surfactant which is a higher fatty acid salt, a higher aliphatic alcohol sulfonate, an alkylbenzene sulfonate, an alkylnaphthalene sulfonate, a dialkylsulfosuccinate, an alkylphosphate, a polyoxyethylene glycol sulfate or a polyoxyethylene phosphate, the total amount of the surfactant and the separating agent being up to 25% by weight based on the ink composition.

5. In a felt tip marking pen ink composition consisting essentially of a volatile organic solvent, a pigment and a resin soluble in said solvent, the improvement wherein there is additionally present an anti-drying additive in an amount effective to permit the formation of a thin solid film on the felt tip when a small amount of said solvent evaporates, which film is readily broken by writing pressure and dissolution of said film in said solvent, said anti-drying agent being selected from the group consisting of:

(a) a glyceride of the general formula

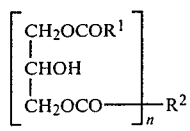

wherein $R^1$ represents a fatty acid residue of 7–23 carbons, $R^2$ represents a mono- or polybasic hydroxycarboxylic acid residue of 1–23 carbons, and n is an integer of 1 or 2, (b) an alkylamide alcohol of the general formula

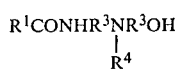

wherein $R^1$ is the same as above, $R^3$ represents an alkylene of 1–4 carbons, and $R^4$ represents hydrogen or a group of the general formula

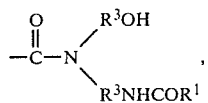

or an intramolecular condensate of the alkylamide alcohol of the formula

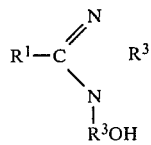

wherein $R^4$ is hydrogen, or salts of said alkylamide alcohol or intramolecular condensate with fatty acids of 1–8 carbons, and (c) a sorbitan fatty acid ester of the general formula

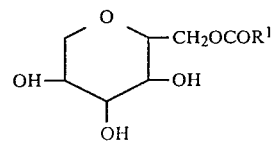

or

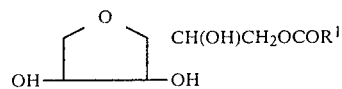

wherein $R^1$ is the same as above.

6. The ink composition as claimed in claim 5 wherein $R^1$ is a fatty acid residue of 13–17 carbons, $R^2$ is malic acid residue, and n is 2.

7. The ink composition as claimed in claim 5 which further includes about 1–25% by weight of a separating agent which is a non-volatile or only slightly volatile liquid or semi-solid at normal temperatures and has a lower vapor pressure than the solvent, and is soluble in the solvent.

8. The ink composition as claimed in claim 5 which further includes up to about 10% by weight of a surfactant selected from the group consisting of a nonionic surfactant which is higher alkyl ether, a higher alkylphenol ether, a higher fatty acid ester or a sorbitan ester of polyoxyethylene glycol, and an anionic surfactant which is a higher fatty acid salt, a higher aliphatic alcohol sulfonate, an alkylbenzene sulfonate, an alkylnaphthalene sulfonate, a dialkylsulfosuccinate, an alkylphosphate, a polyoxyethylene glycol sulfate or a polyoxyethylene phosphate, the total amount of the surfactant and the separating agent being up to 25% by weight based on the ink composition.

* * * * *